US012112519B1

(12) United States Patent
Polichroniadis et al.

(10) Patent No.: US 12,112,519 B1
(45) Date of Patent: Oct. 8, 2024

(54) SCRIPTED INTERACTIVE SCENARIOS BASED ON SCENE GRAPH MATCHING

(71) Applicant: Apple Inc., Cupertino, CA (US)

(72) Inventors: Alexander S. Polichroniadis, San Francisco, CA (US); Angela Blechschmidt, San Jose, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/678,090

(22) Filed: Feb. 23, 2022

Related U.S. Application Data

(60) Provisional application No. 63/152,895, filed on Feb. 24, 2021.

(51) Int. Cl.
*G06V 10/74* (2022.01)
*G06T 17/00* (2006.01)
*G06V 10/762* (2022.01)
*G06V 10/80* (2022.01)
*G06V 20/70* (2022.01)

(52) U.S. Cl.
CPC ............ *G06V 10/761* (2022.01); *G06T 17/00* (2013.01); *G06V 10/7635* (2022.01); *G06V 10/80* (2022.01); *G06V 20/70* (2022.01); *G06T 2210/61* (2013.01)

(58) Field of Classification Search
None
See application file for complete search history.

(56) References Cited

U.S. PATENT DOCUMENTS

| 9,092,437 | B2 * | 7/2015 | Joy ................... G06F 16/4393 |
| 9,911,232 | B2 | 3/2018 | Shapira et al. |
| 10,607,105 | B1 * | 3/2020 | Papon ................. G06T 17/005 |
| 10,825,237 | B2 | 11/2020 | Gorur Sheshagiri et al. |
| 10,853,398 | B2 | 12/2020 | Fisher |
| 2004/0139080 | A1 * | 7/2004 | Schmidt ............... G06T 17/005 |
| 2014/0037140 | A1 | 2/2014 | Benhimane et al. |
| 2014/0072171 | A1 * | 3/2014 | Tu ....................... G06F 18/2323 |
| | | | 382/103 |

(Continued)

FOREIGN PATENT DOCUMENTS

| WO | 2019213450 | 11/2019 |
| WO | 2020/075098 A1 | 4/2020 |

OTHER PUBLICATIONS

U.S. Patent and Trademark Office, Notice of Allowance, U.S. Appl. No. 17/678,629, 10 pages, Jul. 24, 2023.

(Continued)

*Primary Examiner* — Hilina K Demeter
(74) *Attorney, Agent, or Firm* — Thompson Hine LLP

(57) ABSTRACT

An exemplary process obtains sensor data for a physical environment, generates a local scene graph for the physical environment based on the sensor data, wherein the local scene graph represents a set of objects and relationships between the objects, matches the local scene graph with a principal scene graph of a set of principal scene graphs, and executes one or more scripted actions involving the objects based on a narrative associated with the matched principal scene graph. In some implementations, the set of principal scene graphs is generated by generating local scene graphs for a plurality of environments, and generating individual scene graphs each representative of local scene graphs.

20 Claims, 9 Drawing Sheets

(56) References Cited

U.S. PATENT DOCUMENTS

| | | | |
|---|---|---|---|
| 2014/0184606 A1* | 7/2014 | de Richebourg | G06T 11/001 345/440 |
| 2015/0348316 A1* | 12/2015 | Porcino | G06T 15/04 345/426 |
| 2016/0104264 A1* | 4/2016 | Arulesan | G06T 15/04 345/582 |
| 2016/0259993 A1 | 9/2016 | Ulbricht | |
| 2016/0358306 A1* | 12/2016 | Begeman | G06T 1/60 |
| 2017/0178400 A1* | 6/2017 | Boulkenafed | G06T 19/20 |
| 2018/0255290 A1* | 9/2018 | Holzer | H04N 13/275 |
| 2019/0197785 A1* | 6/2019 | Tate-Gans | G06T 19/006 |
| 2019/0304198 A1 | 10/2019 | Costa | |
| 2020/0036816 A1 | 1/2020 | Babu et al. | |
| 2020/0118314 A1* | 4/2020 | Ranzinger | G06F 16/56 |
| 2020/0050871 A1 | 5/2020 | Block | |
| 2020/0151277 A1* | 5/2020 | Fisher | G06T 17/00 |
| 2020/0320794 A1* | 10/2020 | Huang | G06F 3/1454 |
| 2020/0401835 A1* | 12/2020 | Zhao | G06V 10/426 |
| 2021/0374489 A1* | 12/2021 | Prakash | G06F 18/24 |
| 2022/0092862 A1 | 3/2022 | Faulkner et al. | |
| 2022/0129228 A1 | 4/2022 | Babb | |

OTHER PUBLICATIONS

U.S. Patent and Trademark Office, Notice of Allowance, U.S. Appl. No. 17/678,544, 9 pages, Jun. 14, 2023.

Yu, Bangguo, et al., "A Bottom-up Framework for Construction of Structured Semantic 3D Scene Graph"; 2020 IEEE/RSJ International Conference on Intelligent Robots and Systems; Oct. 25-29, 2020, Las Vegas, NV, USA (Virtual); pp. 8224-8230.

* cited by examiner

SCRIPTED INTERACTIVE SCENARIOS BASED ON SCENE GRAPH MATCHING

CROSS-REFERENCE TO RELATED APPLICATIONS

This application claims the benefit of U.S. Provisional Application Ser. No. 63/152,895 filed Feb. 24, 2021, which is incorporated herein in its entirety.

TECHNICAL FIELD

The present disclosure generally relates to systems, methods, and devices for providing views of environments on electronic devices where the views include objects that perform actions based on predefined routines and other scripts that reference real world objects.

BACKGROUND

Various techniques are used to identify physical objects in physical environments, e.g., a "scene." For example, images captured by a sensor on an electronic device may be automatically evaluated to determine that a physical environment includes a table, a chair, and a cup. When creating virtual content for a narrative based on the physical environment, developers often assume that a scene has certain default objects. For example, a living room will typically have a couch, a coffee table, and an end table. However, not all living rooms will have these objects, some may have more objects/furniture, and some may have less. Thus, there is a need to streamline the local scene graph and corresponding objects in the physical environment in order to simplify the need for a developer to match each individual physical environment (i.e., each scene).

A scene graph is a general data structure that is composed of nodes and lines connecting the nodes. The nodes represent objects in the content, and the lines connecting them represent the relationships between the nodes. For instance, a lamp on a table image can be represented by a scene graph having two nodes (lamp and table) and a line representing "on" connecting them.

SUMMARY

Various implementations disclosed herein include devices, systems, and methods that extracts principal scene graphs that are each representative of objects and relationships between those objects in multiple environments. These principal scene graphs are used to provide content based on executing associated narratives, i.e., graph-matched scripted action narratives. For a user's current environment, the most similar principal scene graph to the environment may be selected and the associated narrative executed.

In general, one innovative aspect of the subject matter described in this specification can be embodied in methods that include the actions of obtaining sensor data for a physical environment, generating a local scene graph for the physical environment based on the sensor data, wherein the local scene graph represents a set of objects and relationships between the objects, matching the local scene graph with a principal scene graph of a set of principal scene graphs, and executing one or more scripted actions involving the objects based on a narrative associated with the matched principal scene graph.

These and other embodiments can each optionally include one or more of the following features.

In some implementations, each principal scene graph of the set of principal scene graphs includes a different respective combination of objects and relationships. In some implementations, each principal scene graph of the set of principal scene graphs represents a respective set of local scene graphs.

In some implementations, the set of principal scene graphs is generated by generating local scene graphs for a plurality of environments, and generating individual scene graphs each representative of local scene graphs. In some implementations, the set of principal scene graphs is generated using a machine learning method that inputs a representation of the local scene graphs and generates the individual scene graphs based on a clustering algorithm. In some implementations, the clustering algorithm is based on similarity distance measurements between objects within each of the local scene graphs.

In some implementations, the narrative is a first narrative of a plurality of narratives and each principal scene graph of the set of principal scene graphs is associated with a different narrative of the plurality of narratives. In some implementations, the narrative is a first narrative of a plurality of narratives and each narrative is associated with a different action of the one or more scripted actions involving the objects.

In some implementations, the set of principal scene graphs includes a first principal scene graph and a second principal scene graph, and matching the local scene graph with a principal scene graph includes determining that the first principal scene graph matches a first portion of an attribute of the local scene graph, determining that the second principal scene graph matches a second portion of the attribute of the local scene graph, and merging the first principal scene graph and the second principal scene graph to generate a matched principal scene graph.

In some implementations, matching the local scene graph with the principal scene graph is based on determining similarity scores between the local scene graph and each principal scene graph of the set of principal scene graphs.

In some implementations, the method further includes generating, based on the local scene graph, a view of a three-dimensional (3D) environment including the physical environment. In some implementations, executing the one or more scripted actions including presenting the objects within the view of the 3D environment. In some implementations, the 3D environment is an extended reality (XR) experience that is presented to a user. In some implementations, matching the local scene graph with a principal scene graph includes determining whether to generate a virtual object within the view of the 3D environment to match the local scene graph with a principal scene graph; and in accordance with determining to generate the virtual object to match the local scene graph with the principal scene graph, generating the virtual object to be presented within the view of the 3D environment.

In some implementations, the sensor data includes depth data and light intensity image data obtained during a scanning process. In some implementations, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to implementations of some illustrative implementations, some of which are shown in the accompanying drawings.

Figure 1:
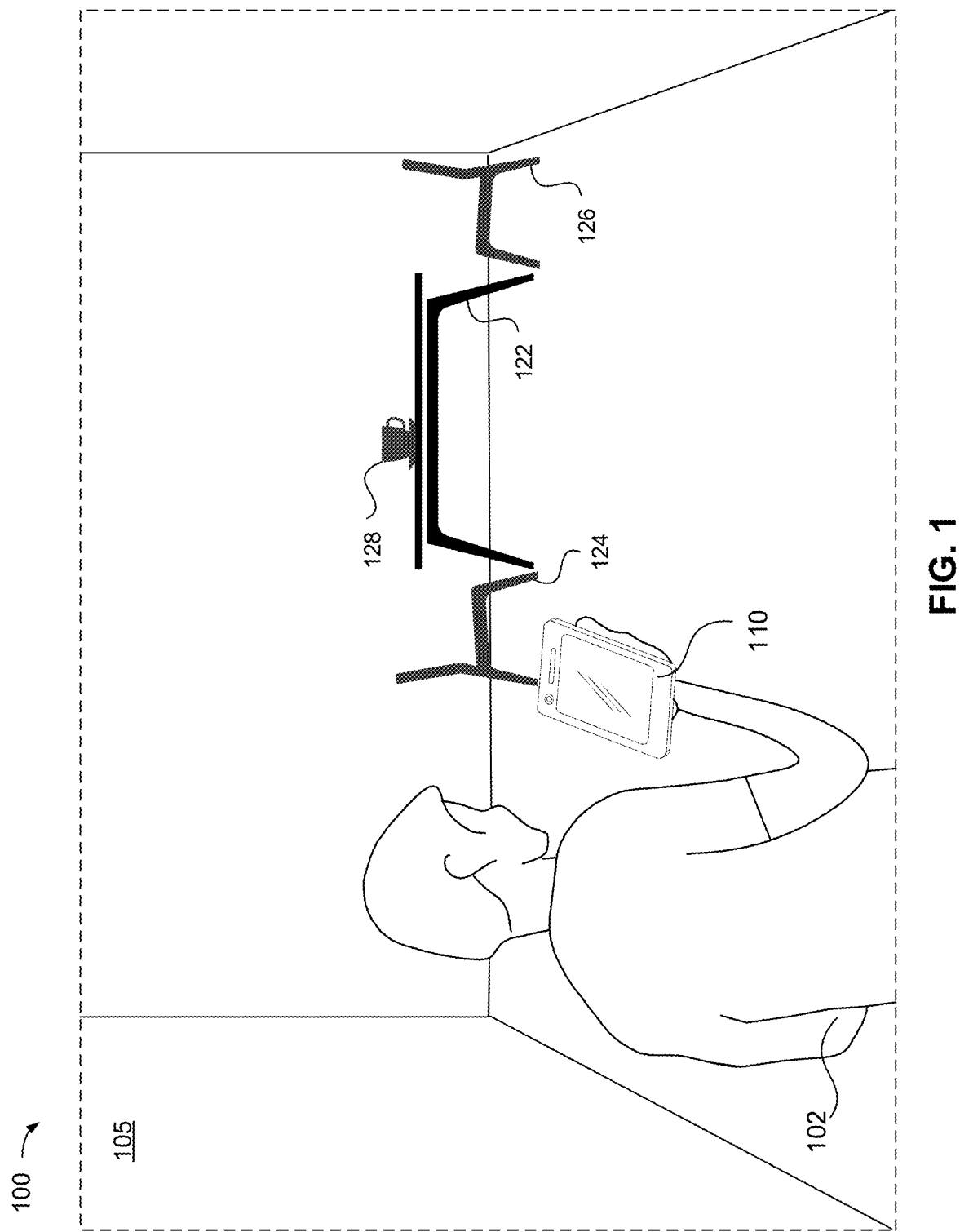
FIG. 1 is an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an example operating environment 100 in accordance with some implementations. In this example, the example operating environment 100 illustrates an example physical environment 105 that includes physical objects such as table 122, chair 124, chair 126, and a cup 128 that is on top of the table. Additionally, example physical environment 105 includes a user 102 holding device 110. While pertinent features are shown, those of ordinary skill in the art will appreciate from the present disclosure that various other features have not been illustrated for the sake of brevity and so as not to obscure more pertinent implementations of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head. As such, the device 110 may include one or more displays provided to display content. For example, the device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

A physical environment, such as physical environment 105, refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
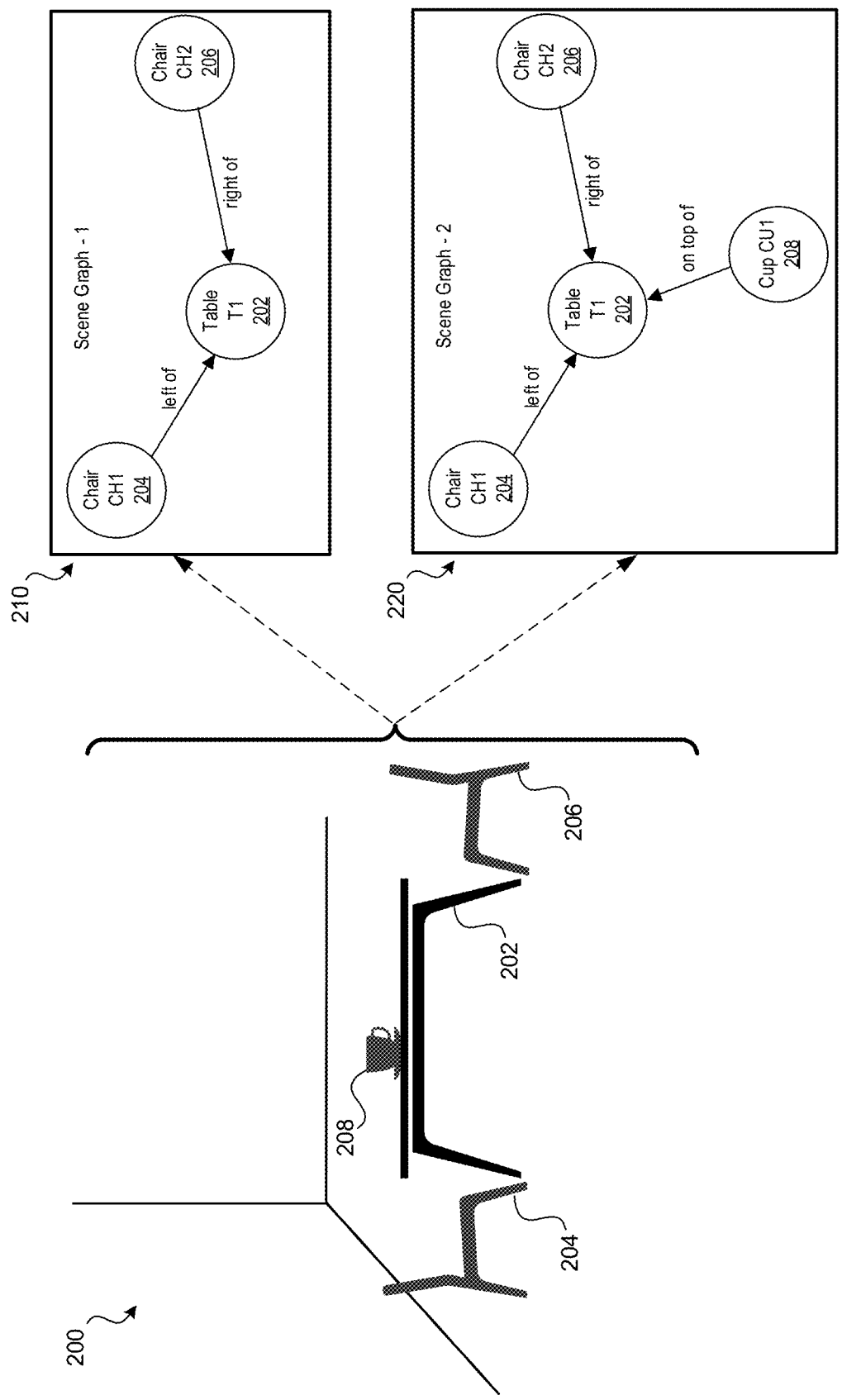
FIG. 2 illustrates an example operating environment and a scene graph representing relationships between objects in the operating environment in accordance with some implementations.

FIG. 2 illustrates an example environment 200 in accordance with some implementations. In this example, the example operating environment 200 illustrates an example physical environment that includes physical objects such as table 202, chair 204, chair 206, and cup 128 that is on top of the table.

Additionally, FIG. 2 illustrates scene graphs 210 and 220 (e.g., local scene graphs for the current environment). The scene graphs 210 and 220 represent example relationships between the objects (e.g., table 202, chair 204, chair 206, and cup 128) in the operating environment 200 in accordance with some implementations. In this example, the scene graph 210 includes a first object, table "T1" 202, a second object, chair "CH1" 204, and a third object, chair "CH2" 206. The scene graph 220 includes a first object, table "T1" 202, a second object, chair "CH1" 204, a third object, chair "CH2" 206, and a fourth object, cup "CU1" 208. The example scene graphs 210, 220 identify relationships between each object. For example, the scene graphs 210 includes a first relationship that identifies that the chair CH1 204 is "left of" table T1 202. A second relationship identifies that the chair CH2 206 is "right of" the table T1 202. Additionally, the scene graphs 220 includes the same relationships as scene graphs 210, but further includes a third relationship that identifies that the cup CU1 208 is "on top of" the table T1 202. It should be noted that the relationships illustrated in the scene graph 210, 220 need not be limited to holding only one label-two, three, or more labels per relationship may be desirable.

In some implementations, scene graphs are generated by transforming a semantic mesh into a graph. In some implementations the scene graphs are generated by transforming a point cloud into a graph. In some implementations, a physical environment (e.g., physical environment 105) is represented by object information that identifies objects and their 2D or 3D positions, e.g., using 2D or 3D bounding boxes, and the representation of the physical environment is transformed into a graph. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features that are represented in a graph.

In some implementations, the 3D shape of a semantic mesh may represent surfaces of objects of a physical environment and at least some of the vertices of the semantic mesh have semantic labels identifying object type (e.g., table, chair, vase, etc.). In such a mesh, for example, vertices on the floor surface may be labelled "floor", vertices on a chair's surfaces may be labelled "chair."

In some implementations, generating a semantic mesh involves estimating depths of different portions (e.g., pixels) of multiple images of a physical environment, correlating relationships (e.g., transforms) between poses of a camera used to capture the images, and generating a 3D mapping or other reconstruction of surfaces in the physical environment. Such a mapping/reconstruction may include locations in a 3D coordinate system for different surface points. In some implementations, a 3D triangle-based mesh is generated and each vertex of the mesh stores or otherwise is associated with a location, e.g., x, y, z positional information. One or more machine learning methods may be used to generate a 3D reconstruction. A machine learning method may include machine learning algorithms (such as PCA, clustering algorithms, etc.) and/or machine learning models (such as neural network-based approaches).

In some implementations, generating a semantic mesh involves techniques that do not utilize a machine learning method. For example, one exemplary method uses an algorithm to project vertices of a 3D reconstruction mesh onto semantic segmentation images from different viewpoints and then uses a majority voting technique to determine final vertices labels.

In some implementations, semantic information is included in or added to a 3D reconstruction of a physical environment. One or more machine learning methods may be used to classify objects, include, or add semantic information to a 3D reconstruction. In some implementations, a machine learning method is used to generate semantic labels for pixels of one or more images of the physical environment. Such semantic labels may be associated with corresponding portions of a 3D reconstructions based on determining associations between images and the 3D reconstruction. In some implementations, a machine learning method uses a 3D reconstruction and semantically labelled images (e.g., automatically labelled images) as input to produce a semantically-labeled mesh, e.g., a semantic mesh having at least some vertices that are associated with semantic labels.

In some implementations, transforming the semantic mesh into a graph involves converting the vertices of the semantic mesh to nodes and determining edges connecting nearby nodes to one another. The edges of the graph may represent the sides of the faces of the semantic mesh. The nodes may store information about the coordinates (e.g., x, y, z coordinates), semantic labels, and other information extracted from the semantic mesh.

In some implementations, graph reduction reduces the complexity of the original semantic mesh or the graph representing the original semantic mesh, for example, reducing the number of nodes in such a graph. In some implementations, instance detection involves identifying or estimating separate instances of objects in the semantic mesh or graph representing the semantic mesh. In some implementations, instance detection is performed using a machine learning method that utilizes semantic locations and 3D locations of nodes of the graph to identify instances.

In some implementations, a machine learning method is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

An image of the physical environment and/or pose information about the position and orientation of a camera capturing the image may additionally be input to the machine learning method to further improve its accuracy or efficiency. Camera pose information may be used to produce viewpoint specific relationships. For example, if an XR environment is being produced using live images, the pose (e.g., location and orientation) of the user's current device may be used to facilitate a viewpoint specific relationship determination, e.g., identifying that, from the user's current viewpoint, the chair is in front of the table.

In some implementations, the machine learning method outputs a graph representing the objects and their relationships, e.g., scene graph 210 and 220. In some implementations, the machine learning method outputs pairwise relationships between objects. A relationship between two or more objects may be represented in any suitable format for output and use.

Figure 3:
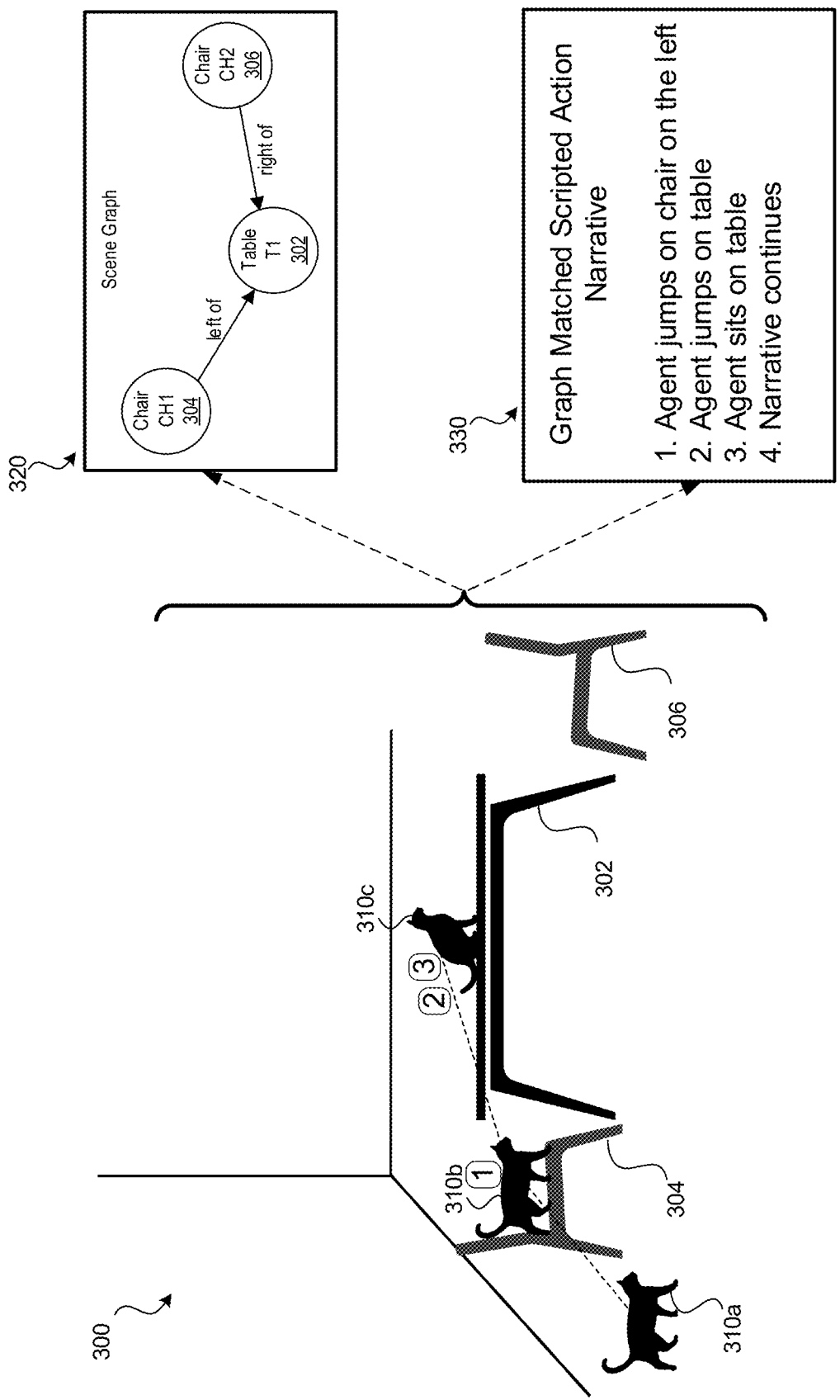
FIG. 3 illustrates an example operating environment, a scene graph representing relationships between objects in each operating environment, and a graph matched scripted action narrative in accordance with some implementations.
Figure 4:
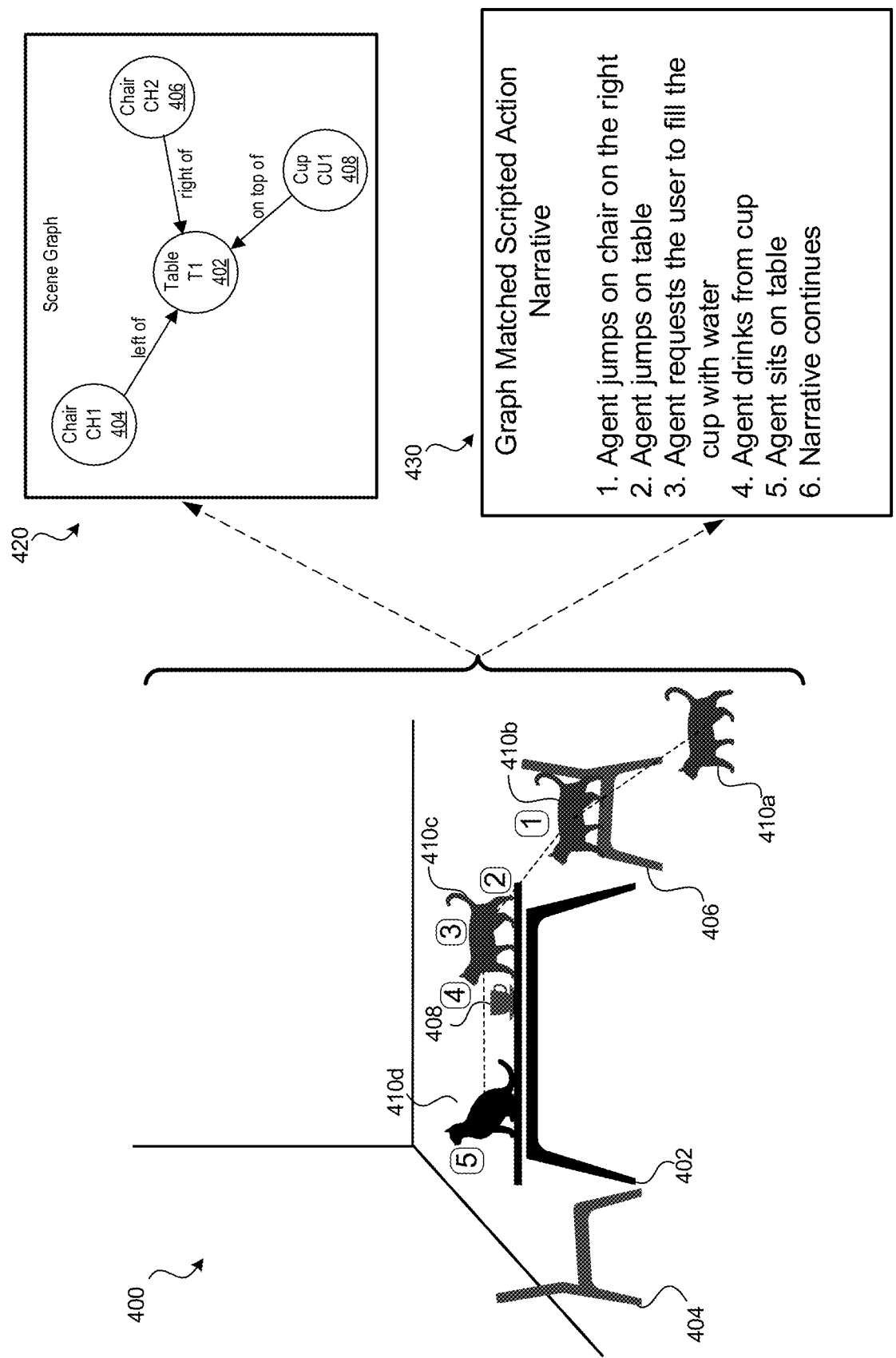
FIG. 4 illustrates an example operating environment, a scene graph representing relationships between objects in each operating environment, and a graph matched scripted action narrative in accordance with some implementations.
Figure 5:
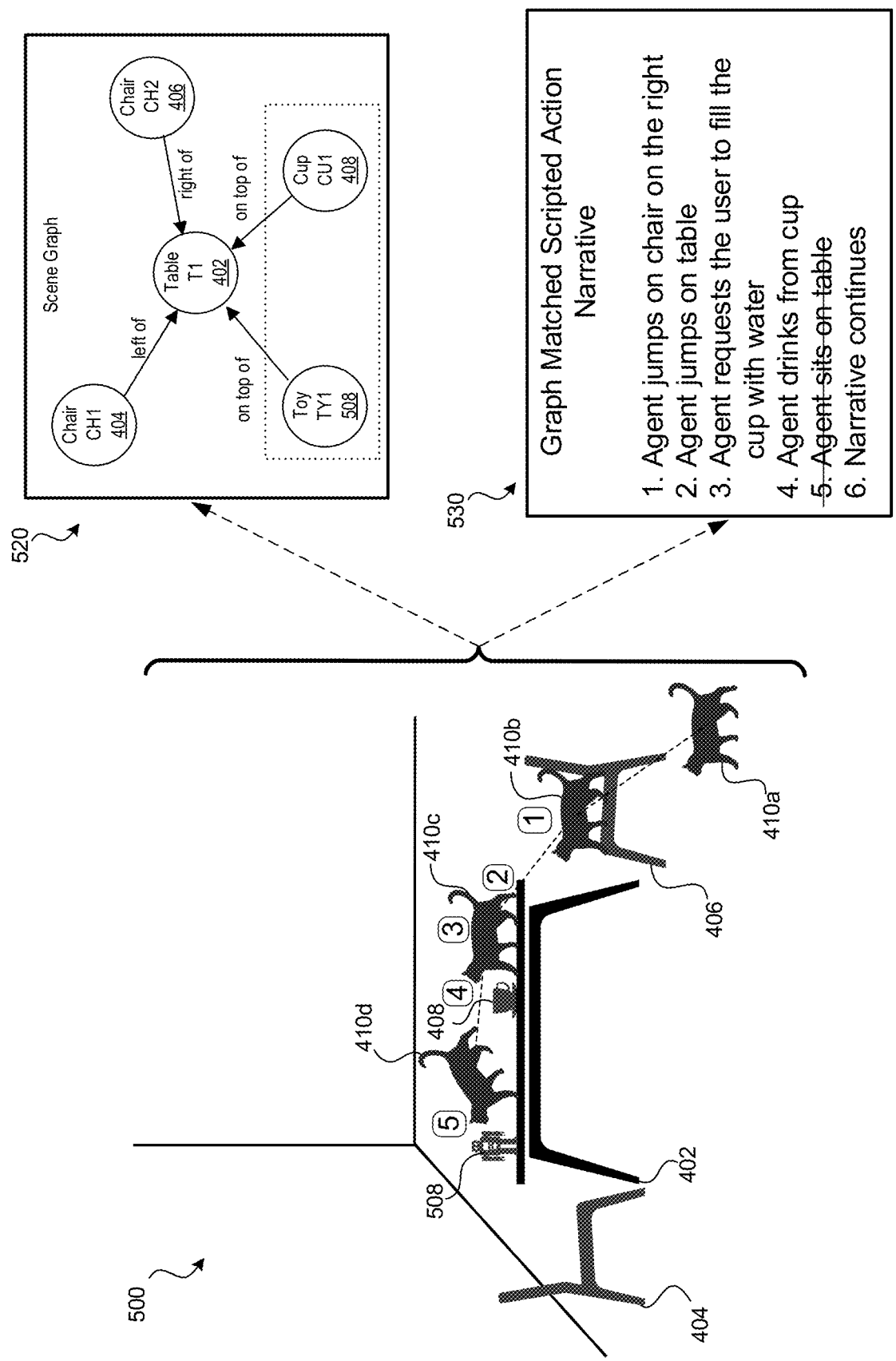
FIG. 5 illustrates an example operating environment, a scene graph representing relationships between objects in each operating environment, and a graph matched scripted action narrative in accordance with some implementations.

FIGS. 3-5 illustrate example operating environments, scene graphs representing relationships between objects in each operating environment, and a graph matched scripted action narrative in accordance with some implementations.

FIG. 3 illustrates an example environment 300 in accordance with some implementations. In this example, the example operating environment 300 illustrates an example physical environment that includes physical objects such as table 302, chair 304, and chair 306. The scene graph 320 (e.g., a local scene graph for the current environment) represents an example relationship between the objects (e.g., table 302, chair 304, and chair 306) in the operating environment 300 in accordance with some implementations. In this example, the scene graph 320 includes a first object, table "T1" 302, a second object, chair "CH1" 304, and a third object, chair "CH2" 306. The example scene graph 320 identifies relationships between each object. For example, the scene graphs 320 includes a first relationship that identifies that the chair CH1 304 is "left of" table T1 302. A second relationship identifies that the chair CH2 306 is "right of" the table T1 302. It should be noted that the relationships illustrated in the scene graph 320 need not be limited to holding only one label-two, three, or more labels per relationship may be desirable.

Additionally, FIG. 3 illustrates graph matched scripted narrative 330. As will be further described herein, a principal scene graph may be matched with the local scene graph (e.g., scene graph 320), and a content developer may create a scripted narrative for content (e.g., virtual content) within an environment (e.g., a 3D representation of a physical room) that matches the local scene. That way, when a developer creates content, the developer can just create content for the principal scene graphs, instead of every possible combination of living room configurations, and compose, adapt, and/or scale the virtual experience across all configurations. Graph matched scripted narrative 330 includes some example actions for the agent 310 (e.g., a virtual cat) to execute within the example environment 300 (e.g., an XR experience, an MR experience, etc.). For example, the agent 310a is placed in the environment 300, and the first action of the graph matched scripted narrative 330 is: "Agent jumps on chair on the left." Thus, based on the principal scene graph that was matched to the local scene graph (e.g., scene graph 320), agent 310b jumps on top of chair 304. The second action of the graph matched scripted narrative 330 is: "Agent jumps on the table," and third action is: "Agent sits on table." Thus, based on the principal scene graph, agent 310c jumps on top of the table 302, and then sits on top of the table. The fourth action of the graph matched scripted narrative 330 is a placeholder for a continued action, if any. E.g., "Narrative continues."

In some implementations, the actions for the narrative are further scripted for virtual objects. For example, a virtual vase may be a part of the narrative, where the action could be to have the virtual vase be placed on top of a table in a living room, if the local scene graph matches a principal scene graph of a living room with a table.

FIG. 4 illustrates an example environment 400 in accordance with some implementations. In this example, the example operating environment 400 illustrates an example physical environment that includes physical objects such as table 402, chair 404, chair 406, and cup 408. The scene graph 420 (e.g., a local scene graph for the current environment) represents an example relationship between the objects (e.g., table 402, chair 404, chair 406, and cup 408) in the operating environment 400 in accordance with some implementations. In this example, the scene graph 420 includes a first object, table "T1" 402, a second object, chair "CH1" 404, a third object, chair "CH2" 406, and a fourth object, cup "CU1" 408. The example scene graph 420 identifies relationships between each object. For example, the scene graphs 420 includes a first relationship that identifies that the chair CH1 404 is "left of" table T1 402. A second relationship identifies that the chair CH2 406 is "right of" the table T1 402. A third relationship identifies that the cup CU1 408 is "on top of" the table T1 402. It should be noted that the relationships illustrated in the scene graph 420 need not be limited to holding only one label-two, three, or more labels per relationship may be desirable.

Additionally, FIG. 4 illustrates graph matched scripted narrative 430. As will be further described herein, a principal scene graph may be matched with the local scene graph (e.g., scene graph 420), and a content developer may create a scripted narrative for content (e.g., virtual content) within an environment (e.g., a 3D representation of a physical room) that matches the local scene. That way, when a developer creates content, the developer can just create content for the principal scene graphs, instead of every possible combination of living room configurations, and compose, adapt, and/or scale the virtual experience across all configurations. Graph matched scripted narrative 430 includes some example actions for the agent 410 (e.g., a virtual cat) to execute within the example environment 400 (e.g., an XR experience, an MR experience, etc.). For example, the agent 410*a* is placed within the environment 400, and the first action of the graph matched scripted narrative 430 is: "Agent jumps on chair on the right." Thus, based on the principal scene graph that was matched to the local scene graph (e.g., scene graph 420), agent 410*b* jumps on top of chair 406. The second action of the graph matched scripted narrative 430 is: "Agent jumps on table." Thus, based on the principal scene graph, agent 410*c* jumps on top of the table 402. The third action of the graph matched scripted narrative 430 is: "Agent requests the user to fill the cup with water." For example, a user may be wearing an HMD in an MR/XR experience, and this instruction is given to the user to fill the cup 408 with water. This may be done virtually (e.g., an icon may be selected, or the like), or the user may actually fill a physical cup in the physical environment with water depending, as it depends on the experience. The fourth action of the graph matched scripted narrative 430 is: "Agent drinks from cup." Thus, based on the principal scene graph, agent 410*c* drinks from the cup 408 on top of the table 402, or the agent (e.g., virtual cat) appears to drink from the cup. The fifth action of the graph matched scripted narrative 430 is: "Agent sits on table." Thus, based on the principal scene graph, agent 410*d* sits on top of the table 402. The sixth action of the graph matched scripted narrative 430 is a placeholder for a continued action, if any. E.g., "Narrative continues."

FIG. 5 illustrates an example environment 500 in accordance with some implementations. In this example, the example operating environment 500 is similar to the example operating environment 400 of FIG. 4, except that it includes an additional object (e.g., toy 508) that may disrupt a matched narrative because the additional object was not included in the matched principal graph. For example, FIG. 5 illustrates an example physical environment that includes physical objects such as table 402, chair 404, chair 406, cup 408, and toy 508. The scene graph 420 (e.g., a local scene graph for the current environment) represents an example relationship between the objects (e.g., table 402, chair 404, chair 406, cup 408, and toy 508) in the operating environment 500 in accordance with some implementations. In this example, the scene graph 520 includes a first object, table "T1" 402, a second object, chair "CH1" 404, a third object, chair "CH2" 406, a fourth object, cup "CU1" 408, and a fifth object, toy "TY1" 508. The example scene graph 520 identifies relationships between each object. For example, the scene graphs 520 includes a first relationship that identifies that the chair CH1 404 is "left of" table T1 402. A second relationship identifies that the chair CH2 406 is "right of" the table T1 402. A third relationship identifies that the cup CU1 408 is "on top of" the table T1 402. A fourth relationship identifies that the toy TY1 508 is also "on top of" the table T1 402. It should be noted that the relationships illustrated in the scene graph 420 need not be limited to holding only one label-two, three, or more labels per relationship may be desirable.

Additionally, FIG. 5 illustrates graph matched scripted narrative 530, which is the same graph matched scripted narrative 430, except that the additional object (e.g., toy TY1 508), will disrupt one of the actions. For example, after the agent 410*c* drinks from the cup 408 on top of the table 402 for action number four the fifth action of the graph matched scripted narrative 530 tried to continue with the command: "Agent sits on table." However, because of the location of the toy TY1 508, the agent 410*d* is unable to complete the command at the intended location. Resolving the conflict due to lack of matching every object from the local scene graph to principal scene graph, such as this, may include the need to add additional principal scene graphs, or use a different principal scene graph. Additionally, or alternatively, content developers can write additional scripts for conflict resolution, such has having the agent 410*d* "sit" at a different location than the toy TY1 508.

In some implementations, the additional object (e.g., the toy 508) may be a virtual object that was placed in the scene to enforce a better match to a principal scene graph with an associated narrative. For example, the scripted narrative 530 in FIG. 5 for the agent 410 to drink from the cup, the local scene graph may not include the cup (e.g., there is not a cup on the table within the representation of the dining room). Thus, the system may add a virtual cup to the scene based on a principal scene graph that was selected that includes a cup to fit that specific narrative for the agent 410 to drink from.

Figure 6:
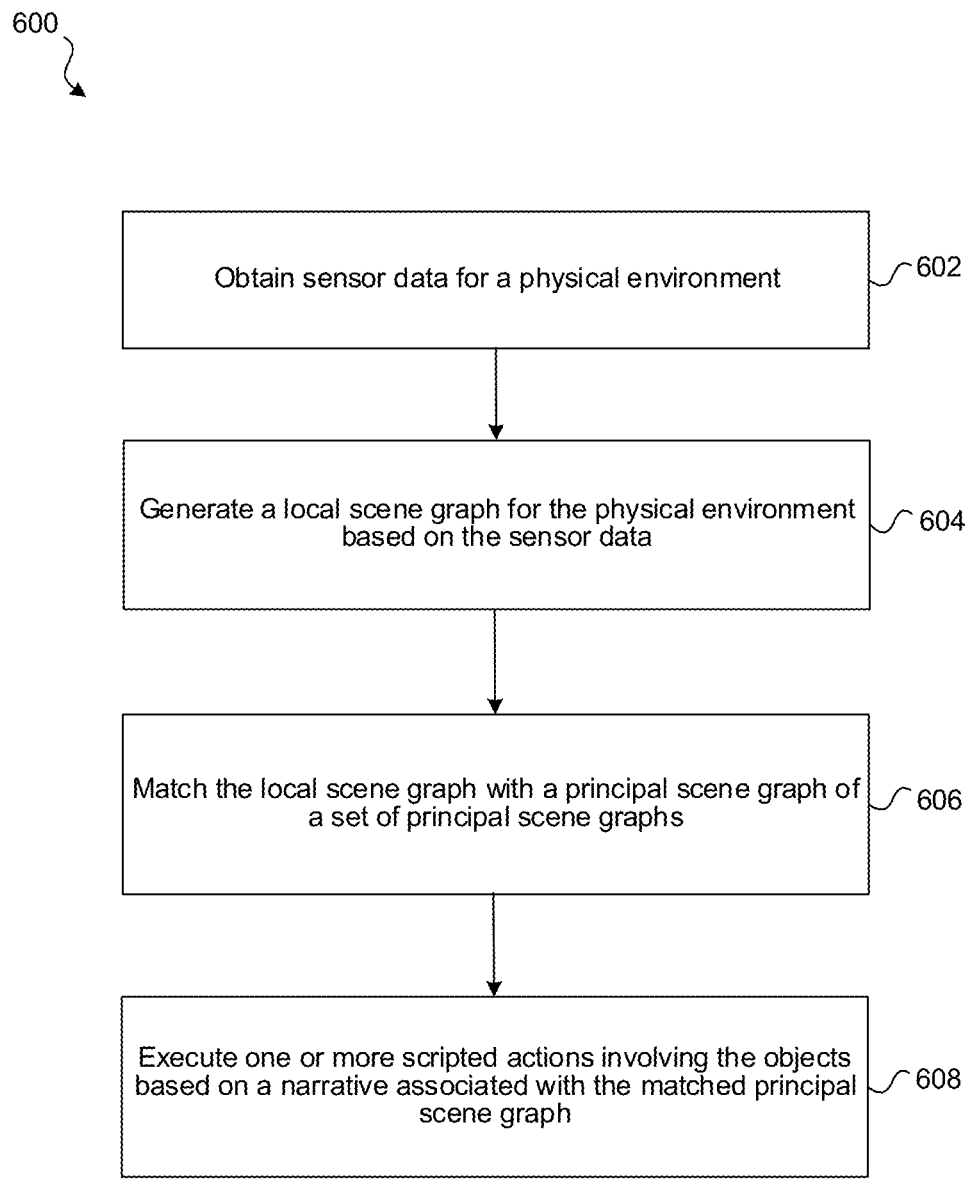
FIG. 6 is a flowchart representation of an exemplary method that matches a local scene graph with a principal scene graph of a set of principal scene graphs and executes one or more scripted actions involving objects based on a narrative associated with the matched principal scene graph in accordance with some implementations.

FIG. 6 is a flowchart representation of an exemplary method 600, performed at an electronic device having a processor, that matches a local scene graph with a principal scene graph of a set of principal scene graphs and executes one or more scripted actions involving objects based on a narrative associated with the matched principal scene graph, in accordance with some implementations. In some implementations, the method 600 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 600 is performed by processing logic, including hardware, firmware, software, or a combination thereof. In some implementations, the method 600 is performed by a processor executing code stored in a non-transitory computer-readable medium (e.g., a memory). The principal scene graph matching process of method 600 is illustrated with examples with reference to FIGS. 2-5 and illustrated as system flow diagrams with reference to FIGS. 7-8.

At block 602, the method 600 obtains sensor data for a physical environment. For example, sensor data for a physical environment may include room scanning techniques (e.g., creating a floorplan) that may include one or more images of the room the user (e.g., user 102) is currently located. In some implementations, the sensor data may include depth data (e.g., time-of-flight data, LIDAR, etc.) from a depth sensor and light intensity image data (e.g., RGB data) obtained during a scanning process. Alternatively, the depth data may be extrapolated from the light intensity image data, thus not requiring a depth sensor. In some implementations, a floorplan can be created based on a user performing a room scan process by moving a mobile device to capture images and depth data around the user in a room.

At block 604, the method 600 generates a local scene graph for the physical environment based on the sensor data, wherein the local scene graph represents a set of objects (e.g., chairs, tables, cups, etc.) and relationships between the objects. The local scene graph may represent various information, for example, providing a hierarchy that represents room type, objects, object-to-object relationships, meta information (e.g., color, material, etc.), and features. An exemplary local scene graph may include a room node and the room node may identify metadata (e.g., room type=living room) and be linked to 4 wall objects, a table object, and six chair objects. Moreover, a chair object may identify metadata and features (e.g., identifying object type/ semantic label=chair, it has a 3D mesh with specific node locations, it has a color of brown, it has particular keyframes or keyframe portions, etc. The scene graph may also represent positional relationships of objects relative to the room and/or one another, e.g., within, adjacent to, facing, etc. For example, positional relationships such as a chair facing table, a cup on top of table, a table next to wall, etc. Some of these different examples of different positional relationships of objects with respect to other objects are illustrated with reference to FIGS. 2-5.

In some implementations, a machine learning method is used to estimate relationships between objects of the semantic mesh or graph representing the semantic mesh. A machine learning method may include machine learning algorithms (such as PCA, clustering algorithms, etc.) and/or machine learning models (such as neural network-based approaches). Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

At block 606, the method 600, matches the local scene graph with a principal scene graph of a set of principal scene graphs. For example, matching the local scene graph is based on determining similarity scores. Based on the comparison or matching, it may be determined that a local scene graph matches a principal scene graph or is very close to matching the objects within the principal scene graph. For example, an output may be a yes/no match determination or a matching score or probability of a match.

In some implementations, the matching the local scene graph with a principal scene graph further includes determining that the first principal scene graph matches a first portion of an attribute of the local scene graph, determining that the second principal scene graph matches a second portion of the attribute of the local scene graph, and merging the first principal scene graph and the second principal scene graph to generate a matched principal scene graph. For example, each principal scene graph of the set of principal scene graphs includes a different respective combination of objects and relationships. Thus, a set of principal scene graphs may be created for the most common scenarios. In some implementations, the principal scene graphs may be used for scaling up or down depending on the actual living room of the user. For example, if there is a principal scene graph for a small living room and a principal scene graph for a large living room, components in both small and large living room principal scene graphs can be blended (e.g., merged) together to scale the experience for a medium sized living room.

Other examples of blending two principal scene graphs together may be used based on the scenario for the local scene graph with respect the scripted narratives to scale to different environments that fall between the two. For example, a first principal scene graph may include a modular sectional sofa set that is placed adjacent to each other in an "L" format in the center of a living room. A second principal scene graph may include a modular sectional sofa set where each piece is separated or spaced out through the living room and against a wall or a corner in the room. Assume the first principal scene graph includes an ottoman in the center, but the second principal scene graph does not include an ottoman. If a local scene graph matches closer to the second principal scene graph because the sectional sofa pieces are spaced out and against the walls, etc., but living room includes an ottoman, the first principal scene graph and the second principal scene graph could be blended together to include an ottoman with the second principal scene graph. For example, a scripted narrative may include an agent (e.g., a virtual cat), jumping onto the ottoman in the center of the living room. Thus, a blended principal scene graph may be used for that particular scripted narrative.

In some implementations, each principal scene graph of the set of principal scene graphs represents a respective set of local scene graphs. For example, if 1,000 living rooms are scanned and local scene graphs are created for each of the 1,000 rooms, 10 principal rooms may be created that match the 10 most common scenarios and the basic components to represent a subset of the 1,000 local scene graphs. The principal scene graphs enable content developers to design content for standardized graph layouts that can be fit to rooms, i.e., the basic components (entities and layout) of a collection of environments can be reduced to principal graphs. In some implementations, the principal scene graphs may not account for each and every room of the 1,000 local scene graphs (e.g., random objects may be in one room that is not common for several other rooms), but, based on the principal scene graph algorithms, it would be likely to cover more than 90% of the local scene graphs, since most living rooms share standard layouts, furniture, etc. Thus a content developer can be given the 10 or so principal scene graphs to develop their content with a confidence that more than 90% of a user's actual living room could be matched to deliver accurate content that matches the user's living room. Thus, as shown in FIG. 4, the agent (e.g., virtual cat) would accurately be able to jump on top of the chair, jump on the table, drink from the cup, and sit on the table.

In some implementations, the set of principal scene graphs is generated by generating local scene graphs for a plurality of environments, and generating (e.g., extracting) individual scene graphs each representative of local scene graphs. In some implementations, the set of principal scene graphs is generated using a machine learning method that inputs a representation of the local scene graphs and generates the individual scene graphs based on a clustering algorithm. For example, a clustering algorithm may include a clustering of embeddings using principal component analysis (PCA). In some implementations, the clustering algorithm is based on similarity distance measurements between objects within each of the local scene graphs. For example, graph similarity distance measurements between detected objects.

In some implementations, matching the local scene graph with a principal scene graph is based on determining similarity scores between the local scene graph and each principal scene graph of the set of principal scene graphs. For example, after a user scan's a room (e.g., a dining room) and the system generates a local scene graph (e.g., object detection, location, etc., and the relationships between each object), that local scene graph can be compared to the set of principal scene graphs that are already created and stored in a database (e.g., ten or so principal scene graphs that were generated for the content developers). For each matching object and relationship to other objects between the local scene graph and each principal scene graph, a similarity score can be tabulated for each principal scene graph. The similarity score could be tabulated as a percentage of similarity (e.g., between 0-100%), or a numerical value that aggregates for each match. For example, if there are 10 principal scene graphs, a similarity score can be determined for each principal scene graph, and the highest similarity score would be the principal scene graph chosen to be used for a scripted action (e.g., executing a narrative developed by a content developer for that specific principal scene graph with the highest similarity score). In some implementations, if the highest similarity score does not meet a similarity threshold (e.g., 80% if percentages are calculated), then a determination that no successful match is made to a principal scene graph, and a particular narrative/action may not be executed. For example, as illustrated in FIG. 5, the agent 410*d* is unable to sit at a particular location because the toy TY1 508 is at that location which was not matched to a principal scene graph. However, assuming the local scene graph 520 is a highest similarity score that meets the similarity threshold (if required) a content developer can still include code that if an object is in the way, to place the agent at slightly different location. E.g., next to the toy TY1 508.

At block 608, the method 600, executing one or more scripted actions involving the objects based on a narrative associated with the matched principal scene graph. For example, in one environment that has no coffee cup, the virtual cat may jump on the chair and walk across the table according to the matched first principal scene graph and the associated first narrative. Moreover, while in another environment that has a coffee cup, the virtual cat may jump on the chair and stop while walking across the table to sip from the coffee cup according to the matched second principal scene graph and the associated second narrative.

In some implementations, the narrative is a first narrative of a plurality of narratives and each principal scene graph of the set of principal scene graphs is associated with a different narrative of the plurality of narratives. In some implementations, the narrative is a first narrative of a plurality of narratives and each narrative is associated with a different action of the one or more scripted actions involving the objects. For example, graph matched scripted narrative 330 of FIG. 3, is a different narrative than graph matched scripted narrative 430 of FIG. 4, and may be based on a different principal scene graph. For example, operating environment 300 does not include a cup, but operating environment 400 includes the cup CU1 408 on the table T1 402 for the agent 410*c* to be able to execute the narrative of drinking from the cup CU1 408 at action number four. Thus, graph matched scripted narrative 430 could not be executed within operating environment 300.

In some implementations, the method 600 further includes generating, based on the local scene graph, a view of a 3D environment including the physical environment. For example, a 3D representation of the physical environment 105 may be created based on scanning the room. In some implementations, executing the one or more scripted actions includes presenting the objects within the view of the 3D environment. For example, displaying a virtual cat within the 3D representation, or displaying a virtual cat in an MR environment where the user is wearing an HMD, but is viewing the physical environment (e.g., pass-through video of the user's room). In some implementations, the 3D environment is an XR experience that is presented to a user. For example, the 3D representation and the virtual cat is all computer generated content, but based on the physical environment of the user. In some implementations, presenting the views of the 3D environment includes presenting video pass-through or see-through images of at least a portion of a physical environment, wherein a 3D reconstruction of at least the portion of the physical environment is dynamically generated.

In some implementation, matching the local scene graph with a principal scene graph includes determining whether to generate a virtual object within the view of the 3D environment to match the local scene graph with a principal scene graph, and in accordance with determining to generate the virtual object to match the local scene graph with the principal scene graph, generating the virtual object to be presented within the view of the 3D environment. For example, adding a virtual object (e.g., a virtual chair) to the local scene graph and the views of the 3D environment to better match the principal scene graph, and thus to better match the scripted action narrative. For example, adding a virtual chair so the scripted action includes the virtual cat jumping on the virtual chair and then jumping on the table. If there was no chair in the local scene graph, and a virtual chair was not generated, the scripted action narrative may generate an error because the virtual cat could not first jump on the chair. Thus, matching the local scene graph with a principal scene graph can include a process of adding virtual objects to better match a principle scene graph.

Figure 7:
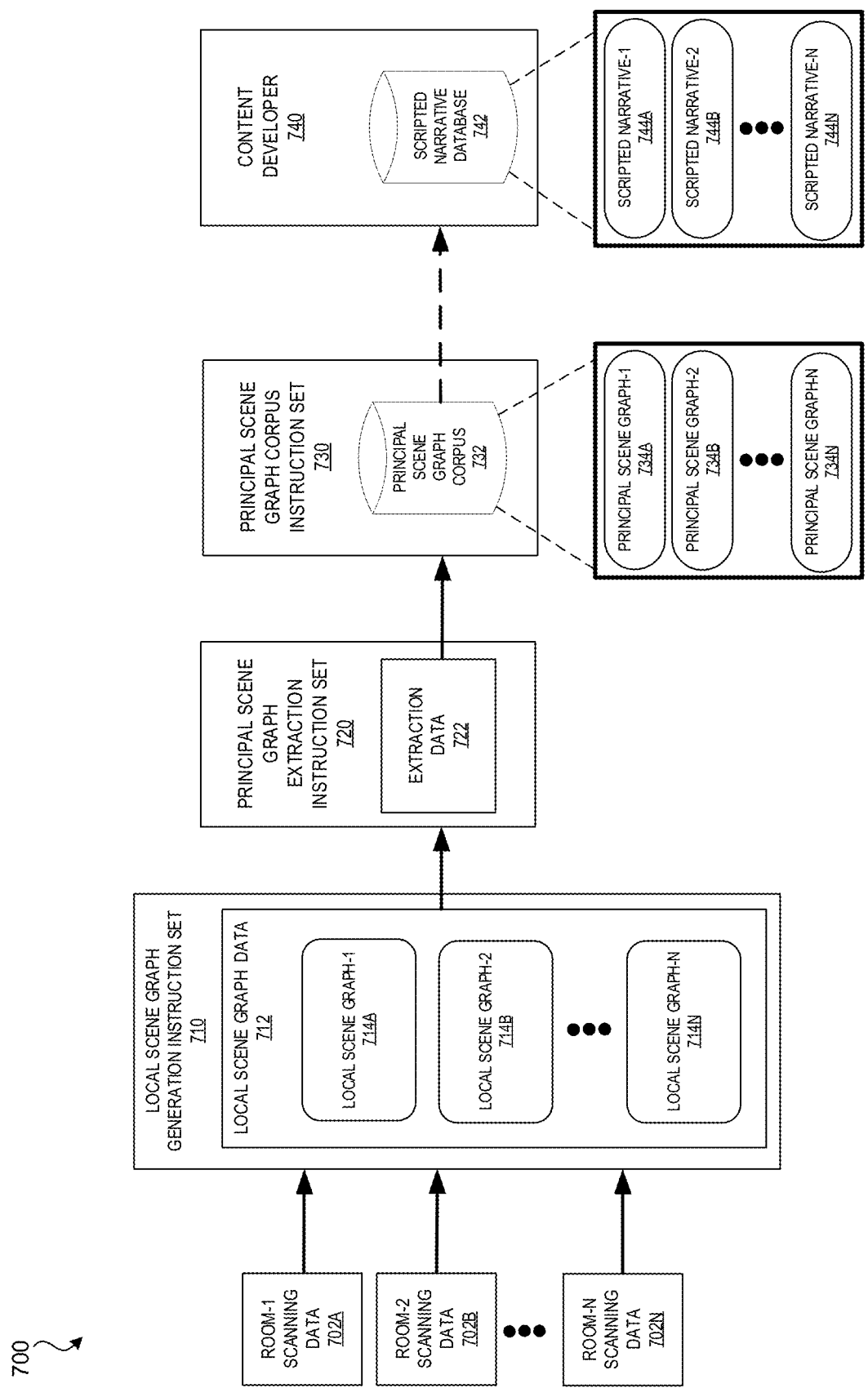
FIG. 7 is a system flow diagram of an example environment in which a system can generate a set of principal scene graphs based on a set of local scene graphs in accordance with some implementations.

FIG. 7 illustrates a system flow diagram of an example environment 700 in which a system can generate a set of principal scene graphs based on a set of local scene graphs according to some implementations. In some implementations, the system flow of the example environment 700 is performed on a device, such as a mobile device, desktop, laptop, or server device. In some implementations, the system flow of the example environment 700 is performed on processing logic, including hardware, firmware, software, or a combination thereof. In some implementations, the system flow of the example environment 700 is performed on a processor executing code stored in a non-transitory computer-readable medium (e.g., a memory).

The system flow of the example environment 700 acquires room scanning data (e.g., image data) for a plurality of physical environments, generates local scene graphs for each physical environment, analyzes the local scene graphs to extract similarities therein (e.g., object detection/location and relationships between each), and generates a principal scene graph database. Additionally, a content developer can obtain each generated principal scene graph and generate a scripted narrative for each principal scene graph. For example, instead of generating a scripted narrative for each local scene graph for the plurality of physical environments (e.g., 1000s of local scene graphs), the content developer only needs to generate a scripted narrative for each generated principal scene graph (e.g., ~10).

In an example implementation, the environment 700 includes an image composition pipeline that acquires or obtains data (e.g., image data from image source(s)) of a physical environment from a sensor on a device (e.g., device 110 of FIG. 1). Room-1 scanning data 702A, Room-2 scanning data 702B, and continuing through Room-N scanning data 702N are generally referred to herein in as Room scanning data 702. Room scanning data 702 are examples of acquiring image sensor data (e.g., light intensity data, depth data, and position information) for a plurality of image frames. For example, a user may acquire image data as the user is in a room in a physical environment (e.g., the physical environment 105 of FIG. 1). The images of the room scanning data can be displayed on the device that has a screen for displaying images and/or a screen for viewing stereoscopic images such as a HMD. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a 3D laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 700 includes a local scene graph generation instruction set 710 that is configured with instructions executable by a processor to generate local scene graphs for each room scanning data received. For example, the local scene graph generation instruction set 710 obtains room scanning data 702 and generates local scene graph data 712. For example, the local scene graph generation instruction set 710 analyzes room scanning data (e.g., room-1 scanning data 702A) for a particular room and generates a corresponding local scene graph for that particular room (e.g., local scene graph-1 714A). Thus, the local scene graph data 712 includes a generated local scene graph (e.g., local scene graph-1 714A, local scene graph-2 714B, through local scene graph-N 714N) for each room included in the room scanning data 702. The generation of local scene graphs is described herein with reference to FIG. 2.

In an example implementation, the environment 700 further includes a principal scene graph extraction instruction set 720 that is configured with instructions executable by a processor to acquire the local scene graph data 712 from the local scene graph generation instruction set 710 and generate extraction data 722. The principal scene graph extraction instruction set 720 analyzes each local scene graph 714A-N, and extracts the individual components to expose commonalities between each. For example, all objects such as furniture, walls, doors, televisions, etc., and their respective relationships between each other are analyzed. Extraction data may include scene understandings or snapshots, such as locations of objects in the environment. For example, Room A may have a TV, couch, sofa, and table, and Room B may be the same as Room A, but no TV. Each room's local scene graph is analyzed and extracted to expose common things in each room.

In some implementations, the environment 700 includes an principal scene graph corpus instruction set 730 that is configured with instructions executable by a processor to assess the extraction data 722 from the principal scene graph extraction instruction set 720 and generates, using techniques described herein (e.g., clustering of embeddings using PCA, graph similarity distance measurements, and the like), the principal scene graph corpus 732. The principal scene graph corpus 732 includes principal scene graph-1, 734A, principal scene graph-2, 734B, through principal scene graph-N, 734N (generally referred to herein as principal scene graphs 734). As discussed herein, the number of principal scene graphs that are generated for principal scene graphs 734 depends on the amount of commonalities determined from the extraction data and is dependent on each subset of rooms that are analyzed. For example, the local scene graphs for a bedroom compared to a kitchen or a living room may each have different layouts that may require more or less principal scene graphs generated to expose enough commonalities in each. For example, 1000 bedrooms may only need 4 or 5 principal scene graphs 734, but 1000 living rooms may need 10 principal scene graphs 734 to include because living rooms may have more variety than bedrooms in terms of objects, walls, doors, furniture, etc. that may or may not be present.

In some implementations, the environment 700 includes a content developer 740 (e.g., a content developer entity) that receives and assesses the principal scene graph corpus 732 from the principal scene graph corpus instruction set 730 and generates scripted narratives to store in the scripted narrative database 742. The scripted narrative database 742 includes scripted narrative-1, 744A, scripted narrative-2, 744B, through scripted narrative-N, 744N (generally referred to herein as scripted narratives 744). As discussed herein, the number of scripted narratives 744 that are generated depends on the number of principal scene graphs 734 that are generated and sent to the content developer 740. As discussed herein with reference to FIG. 3-5, scripted narratives 744 can also be referred to as graph matched scripted narratives (e.g., graph matched scripted narratives 330, 430, and 530). For example, for graph matched scripted narratives 430 of FIG. 4, the agent 410*a* (e.g., a virtual cat) is placed within the environment 400, and the first action is: "Agent jumps on chair on the right." Thus, based on the principal scene graph that was matched to the local scene graph (e.g., scene graph 420), agent 410*b* jumps on top of chair 406.

Figure 8:
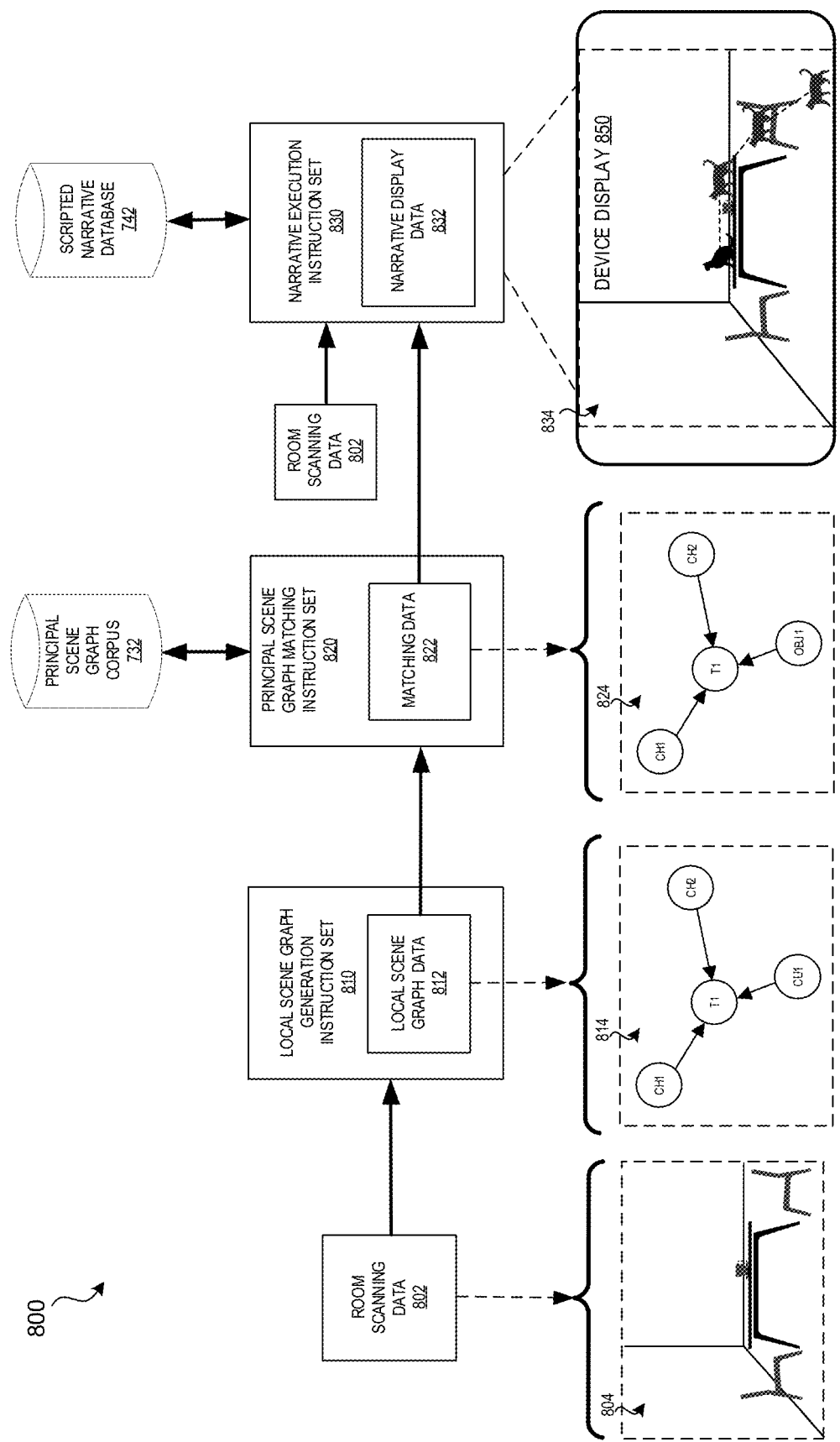
FIG. 8 is a system flow diagram of an example environment in which a system can match to a set of principal scene graphs based on a set of local scene graphs in accordance with some implementations.

FIG. 8 illustrates a system flow diagram of an example environment 800 in which a system can match to a set of principal scene graphs based on a set of local scene graphs according to some implementations. In some implementations, the system flow of the example environment 800 is performed on a device (e.g., device 110 of FIG. 1), such as a mobile device, desktop, laptop, or server device. The images of the example environment 800 can be displayed on the device that has a screen for displaying images and/or a screen for viewing stereoscopic images such as a HMD. In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The overall system flow of the example environment 800 acquires room scanning data (e.g., image data) from sensors for a plurality of physical environments (e.g., the physical environment 105 of FIG. 1), generates a local scene graph for a portion of the physical environment (e.g., a living room), matches the local scene graph to a principal scene graph, and generates narrative display data based on a scripted narrative for the matched principal scene graph. For example, an action narrative for a matched principal scene graph can allow a content developer, for example, to be able to just create content for the principal scene graphs, instead of every possible combination of living room configurations, and compose, adapt, and/or scale the virtual experience across most, if not all, configurations.

In an example implementation, the environment 800 includes an image composition pipeline that acquires or obtains data (e.g., image data from image source(s)) of a physical environment from a sensor on a device (e.g., device 110 of FIG. 1) as room scanning data 802. Room scanning data 802 is an example of acquiring image sensor data (e.g., light intensity data, depth data, and position information) for a plurality of image frames. For example, a user may acquire image data as the user is in a room in a physical environment (e.g., the physical environment 105 of FIG. 1). The images of the room scanning data can be displayed on the device that has a screen for displaying images and/or a screen for viewing stereoscopic images such as a HMD. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 800 includes a local scene graph generation instruction set 810 that is configured with instructions executable by a processor to generate a local scene graph for each room scanning data received. For example, the local scene graph generation instruction set 810 obtains room scanning data 802 and generates local scene graph data 812. For example, the local scene graph generation instruction set 810 analyzes room scanning data 802 for a particular room (e.g., a dining room as illustrated in image 804) and generates a corresponding local scene graph for that particular room (e.g., local scene graph 814). Thus, the local scene graph data 812 includes a generated local scene graph 814 for each room included in the room scanning data 802. The generation of local scene graphs is described herein with reference to FIG. 2.

In an example implementation, the environment 800 further includes a principal scene graph matching instruction set 820 that is configured with instructions executable by a processor to acquire the local scene graph data 812 from the local scene graph generation instruction set 810 and generate matching data 722. The principal scene graph matching instruction set 820 analyzes the local scene graph 814, obtains the plurality of principal scene graphs from the principal scene graph corpus 732, and performs a comparison analysis using the matching techniques described herein (e.g., clustering of embeddings using PCA, graph similarity distance measurements, and the like). For example, all objects such as furniture, walls, doors, televisions, etc., and their respective relationships between each other are analyzed to determine which principal scene graph (e.g., principal scene graphs 734) is the best match (e.g., highest similarity score). As an illustrative example, principal scene graph 824 is illustrated as the best match to the local scene graph 814. For example, the local scene graph 814 includes a chair CH1 to left of Table T1, a chair CH2 to the right of Table T1, and a cup CU1 on top of table T1, and matched principal scene graph 824 includes a chair CH1 to left of Table T1, a chair CH2 to the right of Table T1, and an object OBJ1 on top of table T1. In some implementations, (e.g., based on the narrative) the matched principal scene graph may need to be analyzed and determined that the object OBJ1 may need to meet some specific characteristics in order for a particular action narrative to be executed. For example, the OBJ1, may just need to be any object (e.g., dishware) capable of holding water (e.g., a cup, a bowl, a dish, etc.), and not necessarily be a particular kind of object (e.g., a cup).

In some implementations, the environment 800 includes a narrative execution instruction set 830 that is configured with instructions executable by a processor to obtain and assess the matching data 822 from the principal scene graph matching instruction set 820, the room scanning data 602, and the scripted narratives 744 from the scripted narrative database 742, and generate narrative display data 832 to present content within the 3D environment. In some implementations, the set of views is displayed on the device display 850 of a device (e.g., device 110 of FIG. 1). In some implementations, as illustrated in the example generated environment 834, narrative execution instruction set 830 generates narrative display data 832 (e.g., example operating environment 400 of FIG. 4). For example, if a user is wearing an HMD, a user may be looking at his or her own dining room (e.g., pass-through video or a 3D representation), and the graph matched scripted action narrative 430 is being executed and the agent 410 (e.g., a virtual cat) is performing the listed action steps of the narrative based on the matched principal scene graph 824 that is associated with the local scene graph 814.

Figure 9:
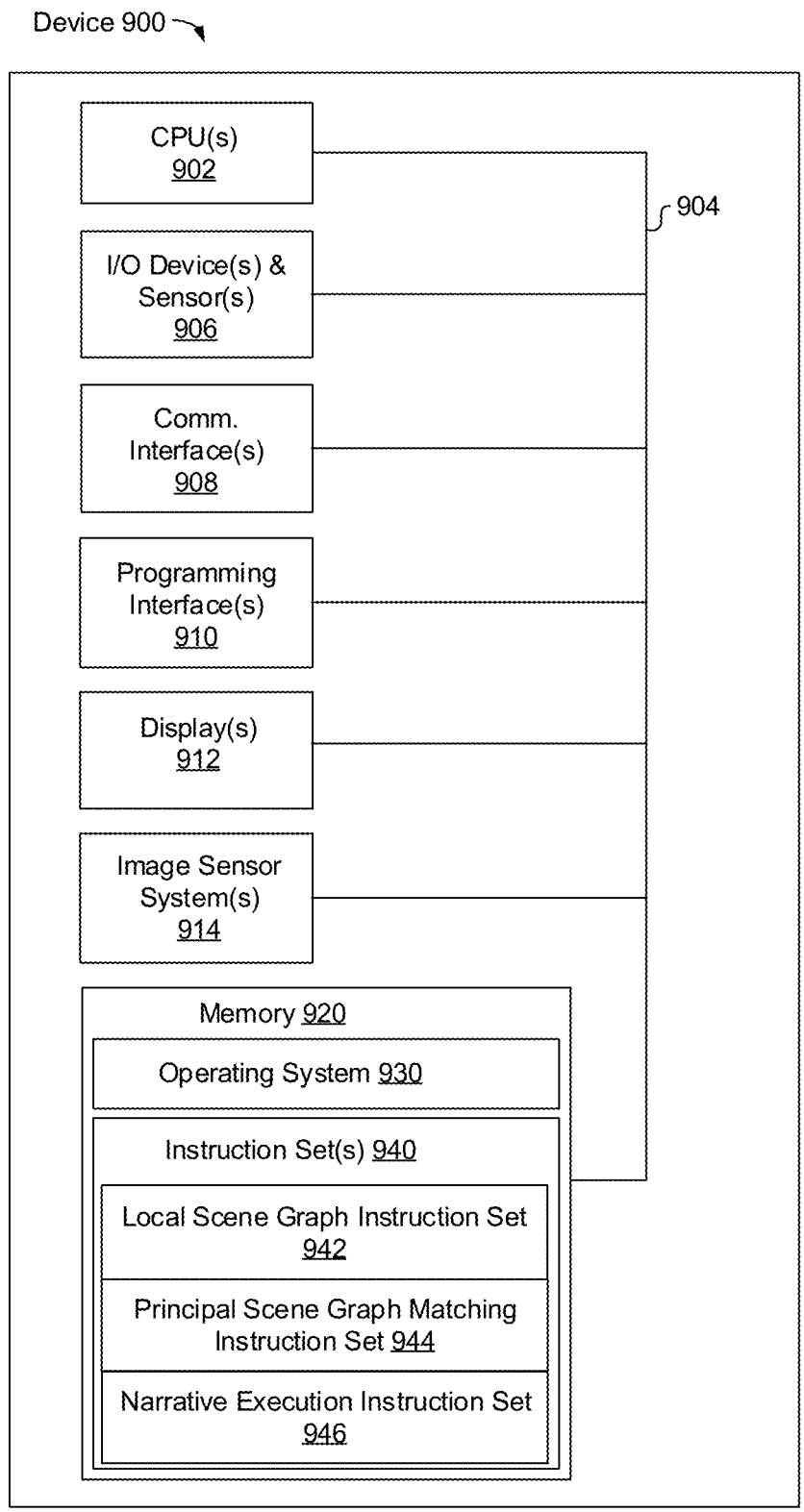
FIG. 9 is an example electronic device in accordance with some implementations.

FIG. 9 is a block diagram of an example device 900. Device 900 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent implementations of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 900 includes a single display. In another example, the device 900 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a local scene graph instruction set 942, a principal scene graph matching instruction set 944, and a narrative execution instruction set 946. The instruction set(s) 940 may be embodied as a single software executable or multiple software executables.

The local scene graph instruction set 942 (e.g., local scene graph generation instruction set 710 of FIG. 7 and local scene graph generation instruction set 810 of FIG. 8) is executable by the processing unit(s) 902 to generate local scene graph data. For example, the local scene graph instruction set 942 obtains room scanning data (image sensor data) and generates a local scene graph for the particular room that is scanned.

The principal scene graph matching instruction set 944 is configured with instructions executable by a processor to assess the local scene graph data from the local scene graph instruction set 942 and the principal scene graph corpus to determine a matching principal scene graph to associate with the local scene graph. For example, the principal scene graph instruction set 944 can determine whether there is principal scene graph with corresponding action narratives that closely matches the generated local scene graph based on performing one or more matching techniques described herein.

The narrative execution instruction set 946 is configured with instructions executable by a processor to assess the room scanning data, matching data from the principal scene graph instruction set 944, and the scripted narratives from a scripted narrative database (e.g., from a content developer), and generate narrative display data to present content within a 3D environment. In some implementations, the narrative execution instruction set 946 generates display data that includes a 3D representation of the physical environment, and a scripted narrative within the 3D representation. For example, if a user is wearing an HMD, a user may be looking at his or her own dining room (e.g., pass-through video or a 3D representation), and a graph matched scripted action narrative can be executed where a virtual cat may perform one or more action steps of the narrative based on the matched principal scene graph that is associated with the local scene graph.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent implementations of the example implementations described herein. Moreover, other effective implementations and/or variants do not include all of the specific details described herein. Thus, several details are described in order to provide a thorough understanding of the example implementations as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device having a processor:
      obtaining sensor data for a physical environment;
      generating a local scene graph for the physical environment based on the sensor data, wherein the local scene graph represents a set of objects and relationships between the objects;
      identifying a principal scene graph from a set of previously obtained principal scene graphs based on matching characteristics and relationships between the set of objects associated with the local scene graph to one or more characteristics and relationships between a set of objects associated with each principal scene graph; and
      executing one or more scripted actions involving the objects based on a narrative associated with the identified principal scene graph.

2. The method of claim 1, wherein each principal scene graph of the set of principal scene graphs comprises a different respective combination of objects and relationships.

3. The method of claim 1, wherein each principal scene graph of the set of principal scene graphs represents a respective set of local scene graphs.

4. The method of claim 1, wherein the set of principal scene graphs is generated by:
   generating local scene graphs for a plurality of environments; and
   generating individual scene graphs each representative of local scene graphs.

5. The method of claim 4, wherein the set of principal scene graphs is generated using a machine learning method that inputs a representation of the local scene graphs and generates the individual scene graphs based on a clustering algorithm.

6. The method of claim 5, wherein the clustering algorithm is based on similarity distance measurements between objects within each of the local scene graphs.

7. The method of claim 1, wherein the narrative is a first narrative of a plurality of narratives and each principal scene graph of the set of principal scene graphs is associated with a different narrative of the plurality of narratives.

8. The method of claim 1, wherein the narrative is a first narrative of a plurality of narratives and each narrative is associated with a different action of the one or more scripted actions involving the objects.

9. The method of claim 1, wherein matching the local scene graph with the principal scene graph is based on determining similarity scores between the local scene graph and each principal scene graph of the set of principal scene graphs.

10. The method of claim 1, further comprising:
    generating, based on the local scene graph, a view of a three-dimensional (3D) environment comprising the physical environment.

11. The method of claim 10, wherein executing the one or more scripted actions comprising presenting the objects within the view of the 3D environment.

12. The method of claim 11, wherein matching the local scene graph with a principal scene graph comprises:
    determining whether to generate a virtual object within the view of the 3D environment to match the local scene graph with a principal scene graph; and
    in accordance with determining to generate the virtual object to match the local scene graph with the principal scene graph, generating the virtual object to be presented within the view of the 3D environment.

13. The method of claim 1, wherein the set of principal scene graphs comprises a first principal scene graph and a second principal scene graph, and matching the local scene graph with a principal scene graph comprises:
    determining that the first principal scene graph matches a first portion of an attribute of the local scene graph;
    determining that the second principal scene graph matches a second portion of the attribute of the local scene graph; and merging the first principal scene graph and the second principal scene graph to generate a matched principal scene graph.

14. The method of claim 1, wherein the electronic device is a head-mounted device (HMD).

15. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining sensor data for a physical environment;
generating a local scene graph for the physical environment based on the sensor data, wherein the local scene graph represents a set of objects and relationships between the objects;
identifying a principal scene graph from a set of previously obtained principal scene graphs based on matching characteristics and relationships between the set of objects associated with the local scene graph to one or more characteristics and relationships between a set of objects associated with each principal scene graph; and
executing one or more scripted actions involving the objects based on a narrative associated with the identified principal scene graph.

16. The device of claim 15, wherein each principal scene graph of the set of principal scene graphs comprises a different respective combination of objects and relationships.

17. The device of claim 15, wherein each principal scene graph of the set of principal scene graphs represents a respective set of local scene graphs.

18. The device of claim 15, wherein the set of principal scene graphs is generated by:
generating local scene graphs for a plurality of environments; and
generating individual scene graphs each representative of local scene graphs.

19. The device of claim 18, wherein the set of principal scene graphs is generated using a machine learning method that inputs a representation of the local scene graphs and generates the individual scene graphs based on a clustering algorithm.

20. A non-transitory computer-readable storage medium, storing program instructions executable by one or more processors of an electronic device to perform operations comprising:
obtaining sensor data for a physical environment;
generating a local scene graph for the physical environment based on the sensor data, wherein the local scene graph represents a set of objects and relationships between the objects;
identifying a principal scene graph from a set of previously obtained principal scene graphs based on matching characteristics and relationships between the set of objects associated with the local scene graph to one or more characteristics and relationships between a set of objects associated with each principal scene graph; and
executing one or more scripted actions involving the objects based on a narrative associated with the identified principal scene graph.

* * * * *